United States Patent
Naamad et al.

(10) Patent No.: US 7,552,280 B1
(45) Date of Patent: Jun. 23, 2009

(54) ASYMMETRICALLY INTERLEAVING ACCESS TO REDUNDANT STORAGE DEVICES

(75) Inventors: Amnon Naamad, Brooklin, MA (US); Ron Arnan, Brookline, MA (US); Sachin More, Westborough, MA (US); Ian Adams, Waltham, MA (US)

(73) Assignee: EMC Corporation, Hopkinton, MA (US)

( * ) Notice: Subject to any disclaimer, the term of this patent is extended or adjusted under 35 U.S.C. 154(b) by 188 days.

(21) Appl. No.: 11/427,082

(22) Filed: Jun. 28, 2006

(51) Int. Cl.
*G06F 12/00* (2006.01)

(52) U.S. Cl. .................. 711/114; 711/170; 711/203

(58) Field of Classification Search ............. 711/158, 711/152, 170, 162, 169, 203, 202, 114, 112, 711/133
See application file for complete search history.

(56) References Cited

U.S. PATENT DOCUMENTS

| | | | |
|---|---|---|---|
| 3,809,574 A | 5/1974 | Duffy et al. | |
| 5,387,539 A | 2/1995 | Yang et al. | |
| 5,702,977 A | 12/1997 | Jang et al. | |
| 5,708,771 A | 1/1998 | Brant et al. | |
| 5,787,459 A | 7/1998 | Stallmo et al. | |
| 5,854,942 A | 12/1998 | Penokie | |
| 5,930,646 A | 7/1999 | Gerung et al. | |
| 5,976,949 A | 11/1999 | Chen | |
| 6,163,422 A | 12/2000 | Blumenau | |
| 6,356,991 B1 * | 3/2002 | Bauman et al. | 711/209 |
| 6,496,914 B1 | 12/2002 | Vook et al. | |
| 6,557,079 B1 * | 4/2003 | Mason et al. | 711/137 |
| 6,711,649 B1 | 3/2004 | Bachmat et al. | |
| 6,912,635 B2 | 6/2005 | Patterson et al. | |
| 6,930,058 B2 | 8/2005 | Hill et al. | |
| 6,933,225 B2 | 8/2005 | Werkhoven et al. | |
| 6,954,833 B1 | 10/2005 | Yochai et al. | |
| 7,053,010 B2 | 5/2006 | Li et al. | |
| 7,263,587 B1 * | 8/2007 | Yeh et al. | 711/158 |
| 2004/0032006 A1 | 2/2004 | Yun et al. | |
| 2004/0059864 A1 * | 3/2004 | Hardman et al. | 711/5 |
| 2005/0079730 A1 | 4/2005 | Beintner et al. | |
| 2006/0075191 A1 | 4/2006 | Lolayekar et al. | |
| 2007/0168625 A1 * | 7/2007 | Cornwell et al. | 711/157 |

FOREIGN PATENT DOCUMENTS

EP 959493 11/1999

OTHER PUBLICATIONS

Kim, Michelle, et al., "Asynchronous Disk Interleaving Approximating Access Delays", IEEE Transactions on Computers, vol. 40, No. 7, Jul. 1991, pp. 801-810.*
US04/021156, Dec. 12, 2005, IPER.

* cited by examiner

*Primary Examiner*—Pierre-Michel Bataille
(74) *Attorney, Agent, or Firm*—Guerin & Rodriguez, LLP; Michael A. Rodriguez

(57) ABSTRACT

Described is a process and device for accessing data stored in multiple logical volumes. The data are replicated on first and second storage elements, such as the redundant hard disk drives of a disk mirror. The multiple logical volumes are divisible into a first logical volume and a second logical volume. All read requests targeting the first logical volume are directed to one of the first and second storage elements. Read requests targeting the second logical volume are asymmetrically interleaved between the first and second storage elements. An asymmetric interleave ratio is determined and implemented that substantially balances the read requests to the multiple logical volumes between the first and second storage elements.

18 Claims, 9 Drawing Sheets

ASYMMETRICALLY INTERLEAVING ACCESS TO REDUNDANT STORAGE DEVICES

FIELD OF THE INVENTION

The present invention relates generally to computer storage. More particularly, the present invention relates to selectively accessing redundant computer storage.

BACKGROUND

Data storage devices include physical storage elements, such as hard-disk drives and tape drives that provide capacity for the storage and later retrieval of data. In some applications, these storage elements are configured redundantly to safeguard against the loss and corruption of data stored thereon. One such class of redundant storage devices is referred to generally as disk mirroring. Mirroring refers to redundant storage elements storing the same data and is a common function found in enterprise storage and RAID devices.

In some applications, the mirrored storage elements are substantially identical in both their physical and logical configurations. Thus, replicated data is stored in the same physical allocation on either of the mirrored storage elements. A storage controller is configured to maintain the same information on each of the redundant storage elements. Thus, data written to one of the drives will be written to both. Data read from either drive, however, will not impact the mirrored configuration of the drives. This provides some leeway in selecting which of the redundant storage devices to read from.

The performance of a disk-drive system is largely impacted by three system characteristics, i.e., seek time, latency, and data rate. The seek time relates to the delay incurred in positioning the head above the appropriate track. In the worst case, the seek time is defined by the delay incurred in moving the head between the inner and outer tracks. The latency of the system is the time it takes for the rotation of the disk to bring the desired sector to a position underlying the head. The worst-case latency is defined by the time it takes to complete a single rotation of the disk. Finally, the data rate of the system relates to how quickly data can be read from or written to the disk once the head is positioned above the appropriate sector.

It is well known that efficiencies can be realized in retrieving data stored on mirrored drives. Disk mirroring can allow each disk to be accessed separately for reading purposes. This effectively doubles the speed of disk read access (halves the seek time). This is an important consideration in hardware configurations that frequently access the data on the disk. Thus, while one storage element may be busy responding to one read request, a second storage element is available to respond to another read request.

SUMMARY

In one aspect, the invention features a process for accessing data stored in a plurality of logical volumes including a first logical volume and a second logical volume. Each logical volume is replicated on first and second storage elements. Each replication stores the same data. All input/output (I/O) access requests targeting the first logical volume are directed to the one of the first and second storage elements. I/O access requests targeting the second logical volume are asymmetrically interleaved between the first and second storage elements.

In another aspect, the invention features storage controller for accessing data stored in multiple logical volumes. The multiple logical volumes include a first logical volume and a second logical volume. Each of the multiple logical volumes is replicated on first and second storage elements, such that each replication stores the same data. The storage controller includes a storage-element selector receiving I/O access requests. The storage-element selector directs all I/O access requests targeted to the first logical volume to one of the first and second storage elements. The storage controller also includes an interleaving module in communication with the storage-element selector. The interleaving module asymmetrically interleaves I/O access requests targeted to the second logical volume between the first and second storage elements.

BRIEF DESCRIPTION OF THE DRAWINGS

The above and further advantages of this invention may be better understood by referring to the following description in conjunction with the accompanying drawings, in which like numerals indicate like structural elements and features in the various figures. The drawings are not meant to limit the scope of the invention. For clarity, not every element may be labeled in every figure. The drawings are not necessarily to scale, emphasis instead being placed upon illustrating the principles of the invention.

DETAILED DESCRIPTION

Different policies are available to read data from multiple logical volumes provided on a mirrored storage device. These policies can be used to distribute the workload between the two disk drives. Certain efficiencies can be realized when the workloads are substantially balanced.

A first policy directs all of the read requests to a given logical volume to a selected one of the mirrored hard-disk drives. This policy can be used to alternately direct read requests to different logical volumes to different hard-disk drives. For example, read requests to even logical volumes can be directed to a first hard-disk drive and requests to odd logical volumes can be directed to a second hard-disk drive. In this manner, the total number read requests can be distributed between the two hard-disk drives. Notwithstanding, because the read-request workload to each of the logical volumes is typically different, it may not be possible to distribute the workload evenly between the hard-disk drives.

A second policy reads half of the requested data from each of the two mirrored hard-disk drives. Although this can balance access for each of the logical volumes, it will also incur substantial seek time as each of the disk drives will be accessing all of the logical volumes. A third policy interleaves a reply to a read request. Again, this too can incur substantial seek time if used for all of the logical volumes. It may be better to use the first policy to distribute requests to some of the logical volumes to different disk drives, then to use one or more of the second and third policies to balance the workload. Nonetheless, because these policies depend upon the workloads of the different logical volumes, it may be unlikely that any arrangement of the three policies can attain a balanced workload.

A mirrored storage device constructed in accordance with the invention permits balancing the workload between mirrored storage devices by asymmetrically interleaving access to storage elements for at least one of the logical volumes. The asymmetric interleaving ratio is selected to distribute the workload between the mirrored disk drives evenly. Although described below primarily with reference to physical mirroring, where two hard disks have the same logical volumes, the invention also applies to "non-physical" mirroring, where logical volume mirrors are stored on non-mirrored physical devices. That is, mirroring exists at the logical volume level, and not necessarily at the physical device level.

Figure 1:
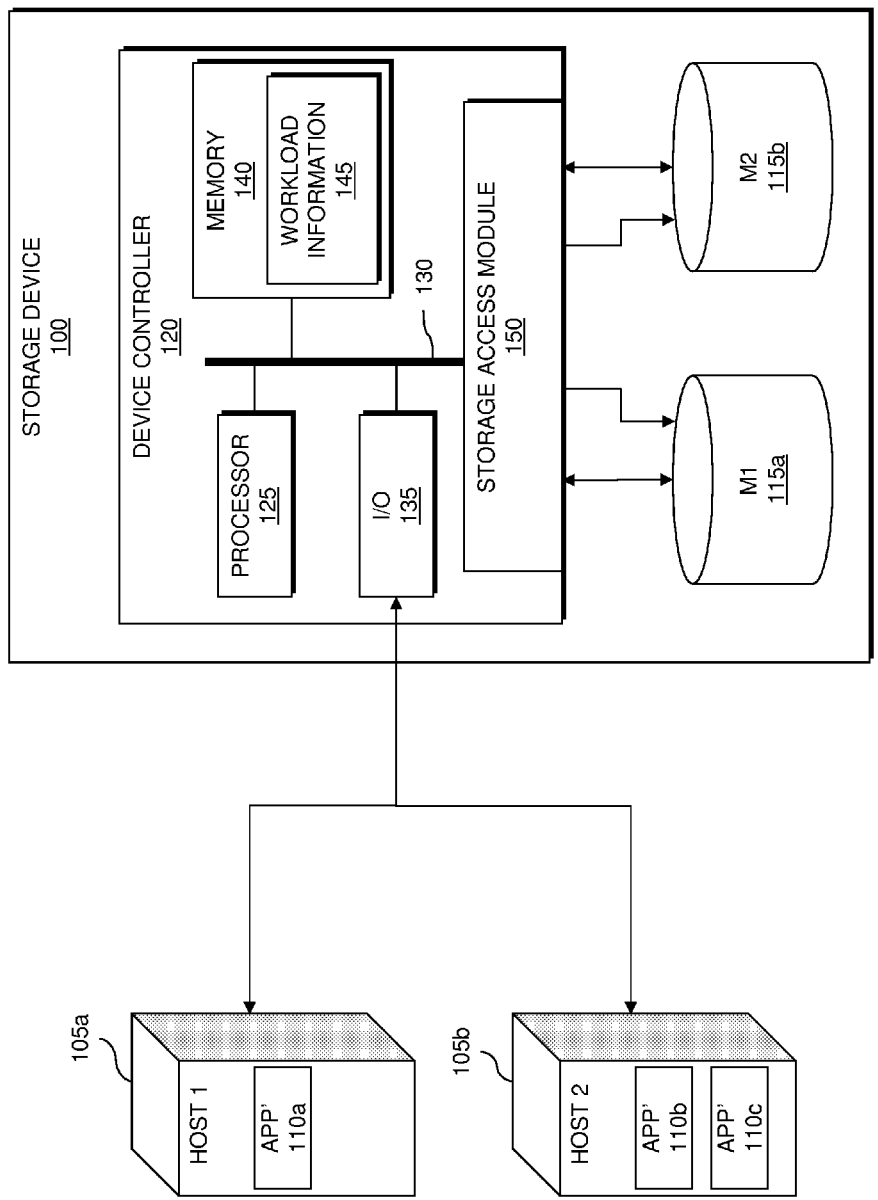
FIG. 1 illustrates a functional block diagram of a storage system accessing redundant storage elements in accordance with one embodiment of the invention.

FIG. 1 illustrates one embodiment of a storage system including redundant storage elements constructed in accordance with the principles of the invention. In the exemplary embodiment, a first host computer 105a and a second host computer 105b are each coupled to a storage device 100. The first host computer 105a is running a first application 110a and the second host computer 105b is running second and third applications 110b, 110c. The storage device 100 includes a device controller 120 in communication with first and second storage elements 115a, 115b (generally 115) providing storage capacity for one application 110. Each of the applications 110a, 110b, 110c (generally 110) independently accesses the storage capacity through input/output commands or storage access requests that are forwarded to the storage device 100 and the device controller 120.

Examples of such host computers 105 include servers such as those available from Sun Microsystems, connected to a cabinet composed of a storage array. Storage arrays that can be used to practice the invention include, but are not limited to, SYMMETRIX® and CLARIION® data storage systems, commercially available from EMC Corporation, of Hopkinton, Mass. Mirroring in SYMMETRIX® systems is performed at the logical volume level, not at the physical level; in CLARIION® systems, mirroring occurs at the physical level.

The device controller 120, in turn, can include a local processor 125, an input/output (I/O) module 135 and local memory 140, each coupled to a common bus 130. A storage access module 150 is also coupled to the bus 130 and to each of the first and second storage elements 115.

In some embodiments, the storage device 100 is collocated with the host computers 105 being coupled to the host computers 105 via a standard communications interface, such as a Small Computer System Interface (SCSI) interface, a universal serial bus (USB) interface, or a FireWire interface. Alternatively or in addition, the storage device 100 can be included within at least one of the host computers 105 being coupled to the host computer via a standard interface, such as Advanced Technology Attachment (ATA), Integrated Drive Electronics (IDE), or Peripheral Component Interconnect (PCI). In some embodiments, the host computers 105 are connected to the storage device 100 through a network, such as a Storage Access Network (SAN) using Fibre Channel protocol or iSCSI protocols.

Figure 2:
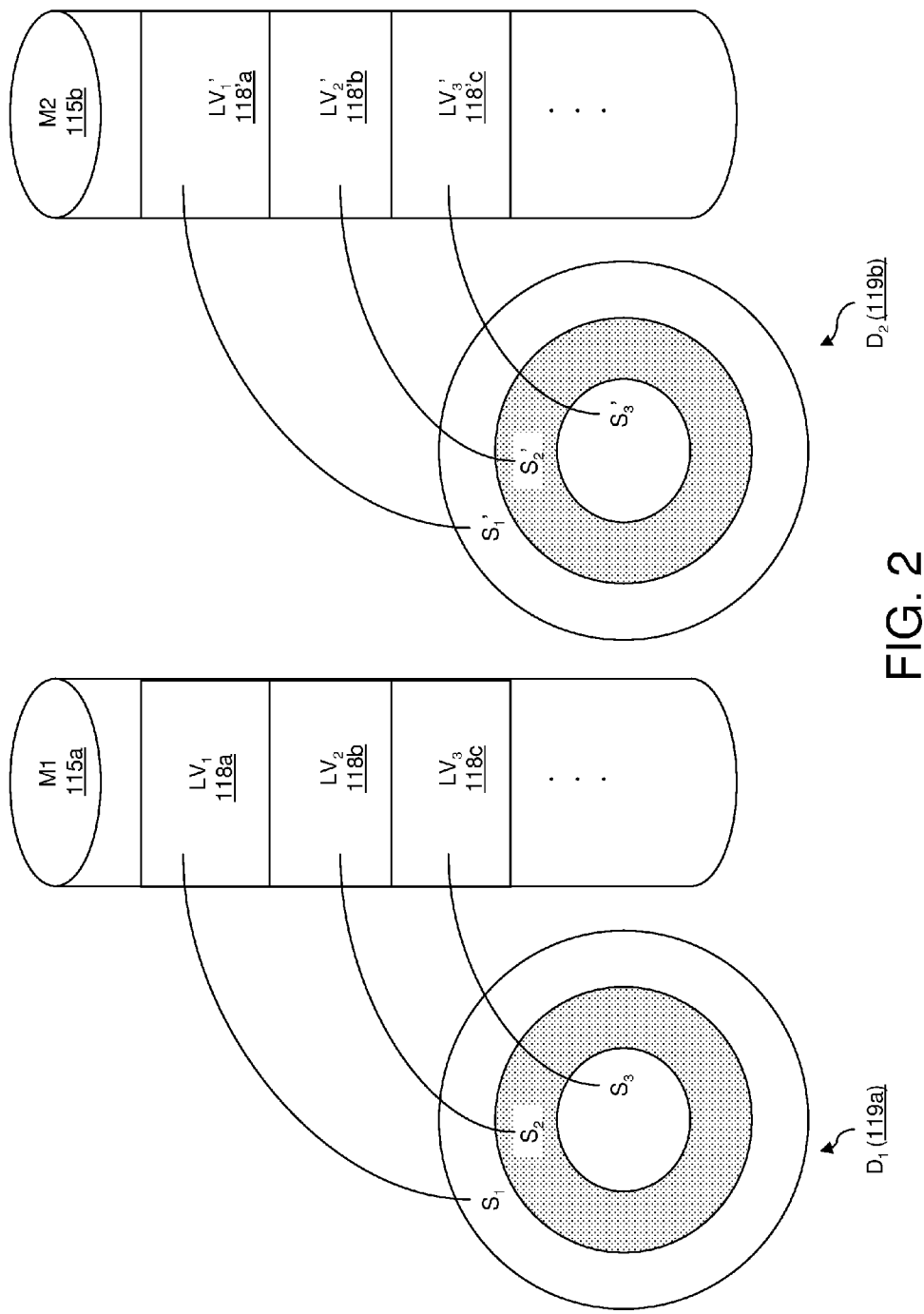
FIG. 2 illustrates a schematic diagram of one embodiment of the redundant storage elements of FIG. 1.

Data is stored on the data storage device 100 in units known as "blocks," which refer to a number of bytes of information. These blocks are stored at physical locations on the storage elements 115 that may refer to a sector on a disk drive. FIG. 2 illustrates in more detail the organization of data stored on the first and second storage elements 115. Storage capacity on each storage element is organized into "logical volumes" 118a, 118b, 118c . . . (generally 118). One or more logical volumes 118 may be located on a physical data storage device, such as one of the storage elements 115. One storage element, such as a hard disk drive can include one or more logical volumes 118. Each logical volume 118 can appear to a requesting application 110 (FIG. 1) as if it were a single hard drive. Thus, each logical volume 118 comprises a portion of a physical data storage device of the storage element 115, and is defined by a physical data storage device number, starting block number, and number of blocks.

For hard disk drive embodiments, physical storage of the logical volumes 118 can be provided by contiguous sections of a disk 119a. Thus, the first logical volume 118a is located on a first section $S_1$, the second logical volume is located on a second section $S_2$, and so forth. The contiguous segments are annular, being formed by cylinders of the drive 119a. For hard disk embodiments, a minimal segment of data that can be read from or written to the logical volumes 118 of the disk 119a is one cylinder.

In some embodiments, the storage device 100 employs disk mirroring, in which each of the two storage elements 115 is arranged as a substantially identical replication of the other. This technique can be used to guard against loss of stored data in the event of a failure of either one, but not both of the storage elements 115. As illustrated in FIG. 2, each of the different storage elements 115 is organized having the same number and arrangement of logical volumes 118. In some embodiments, the logical volumes 118 are stored in the same sectors of each respective physical hard disk drive 119a, 119b.

Referring again to FIG. 1, storage capacity provided by the storage elements 115 is independently accessed by the applications 110 running on the host computers 105. An application 110 can access the storage capacity by reading data from or writing data to the storage element 115. Reads and writes are accomplished by individual read or write commands issued by the application 110 and directed to or targeting a logical volume 118 of the storage element 115. The application 110 need not be unaware of a disk mirroring arrangement, so memory accesses are to respective logical volumes 118 of either of the mirrored storage elements 115. As each mirrored storage element 115 is ideally the same, there is no difference from the perspective of the requesting application 110.

The device controller 120 receives the memory access request through the I/O module 135. The I/O module reformats the request, as required, and directs it toward the storage access module 150. Upon receipt of a read request, the storage access module 150 retrieves the requested data from one of the mirrored storage elements 115 and sends it back to the requesting application through the I/O module 135. Upon receipt of a write request, the storage access module 150 writes the same data to both of the storage elements 115 to maintain synchronization between the two. As used herein, memory access refers to block-level access, sometimes referred to as "low-level" access in contrast to file access used in a file access system. Thus, read/write commands received by the device controller 120 address particular blocks of the logical volumes 118 (FIG. 2).

In general, an I/O access request can be a write request or a read request. A write request identifies a target logical volume and provides one or more blocks of data to be written at the targeted logical volume. In the mirrored storage device 100, the device controller 120 copies the same information identified by the write command into both of the storage elements 115. In some embodiments of a mirrored storage device 100, the same data is written into the same physical storage locations of each storage element 115. A read request identifies a target logical volume a memory location and the number of bytes or blocks of data to be retrieved or copied from the storage element 115. The requested read data can be copied first to local memory 140 of the device controller 120 and from there to the requesting application through the I/O module 135.

Figure 3A:
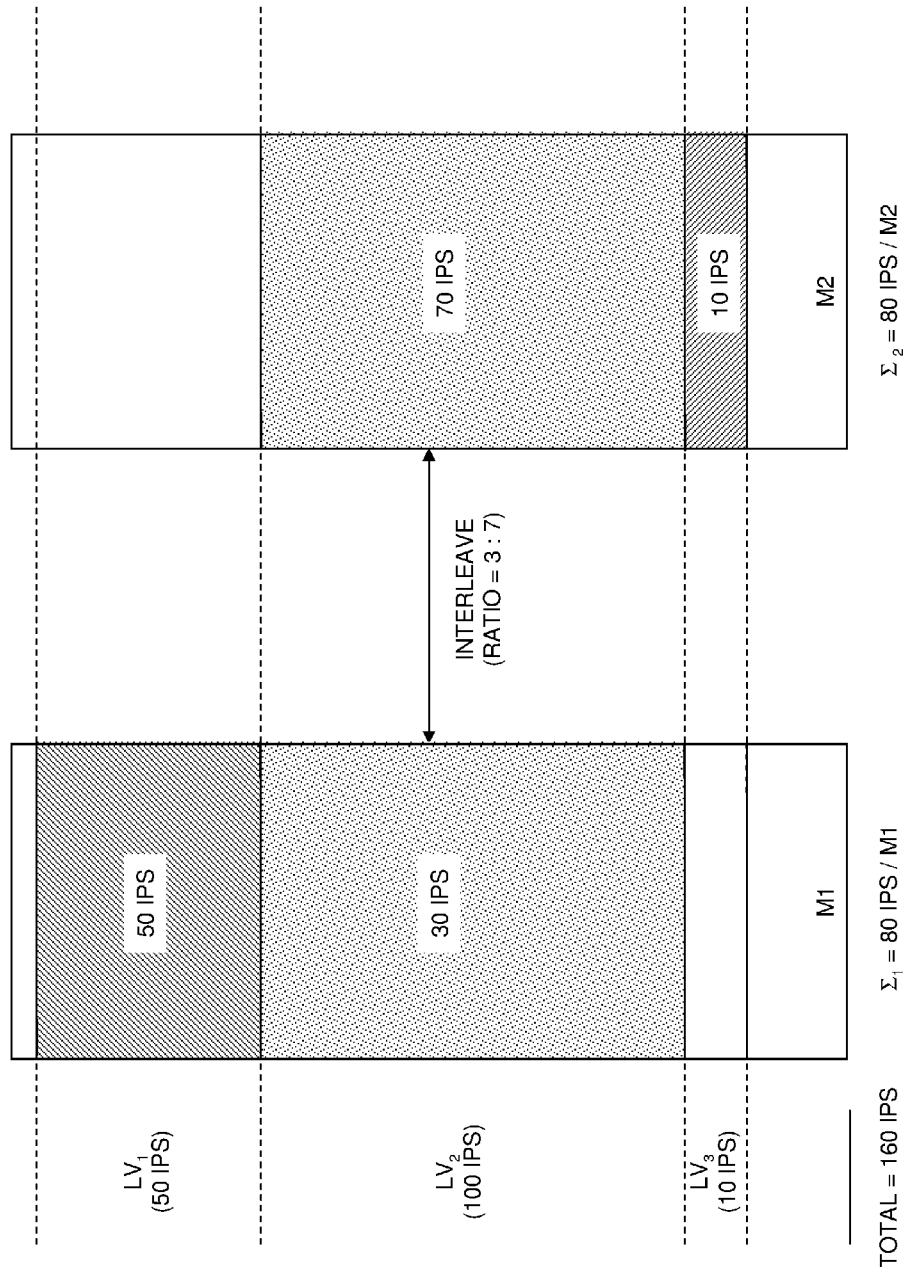
FIG. 3A, FIG. 3B, and FIG. 3C respectively illustrate schematic diagrams of the results of accessing redundant storage elements in accordance with the principles of the invention for different configurations.

FIG. 3A provides a schematic representation of the I/O access workload allocation between two mirrored storage elements M1, M2. Each of the mirrored storage elements M1, M2 is configured with at least three logical volumes $LV_1$, $LV_2$, $LV_3$, as shown. Numbers in parentheses adjacent to each of the logical volumes $LV_1$, $LV_2$, $LV_3$ represents the associated I/O access workload. For example, $LV_1$ has a respective workload of 50 I/O access requests per second (IPS), $LV_2$ has a respective workload of 100 IPS, and $LV_3$ has a respective workload of 10 IPS. These workload variations can result from any number of reasons, such as variable numbers of I/O access requests received from the respective requesting application, or different access rates to the physical cylinders (in the case of a hard disk drive) being read. Cylinders on the inner regions of a hard-disk drive are accessed at a different rate than cylinders located on outer regions.

The workload information may be obtained during an initialization process by separately summing the I/O access requests to each of the different logical volumes $LV_1$, $LV_2$, $LV_3$ that occur during a predetermined period of time, then dividing each of the resulting summations by the predetermined time period. For example, sampling for 1,000 seconds may result in three summations, one for each logical volume: 50,000 for $LV_1$, 100,000 for $LV_2$, and 10,000 for $LV_3$. Each of these summations is divided by the 1,000-second sample period resulting in the indicated workloads.

In accordance with the principles of the invention, a threshold value is determined by first summing together each of the respective workloads for all of the logical volumes to determine a total workload value. Continuing with this example, the total workload value is determined as the sum of the individual workload values.

$$\text{Total Workload: } 50+100+10=160 \text{ IPS} \quad (1)$$

The threshold value is determined by averaging the total workload value over the number of storage elements (i.e., two for the exemplary embodiment having two storage elements M1, M2). Thus, the threshold value is 80 IPS.

Continuing with the exemplary embodiment, all I/O access requests directed to the first logical volume $LV_1$ are directed to the first storage element M1. Based on the associated workload value, this should be about 50 IPS. All I/O access requests directed to the next logical volume $LV_2$ are asymmetrically interleaved between the first and second storage elements M1, M2. As illustrated, this asymmetric interleaving directs 30 IPS of the estimated 100 IPS workload to the first storage elements M1, and 70 IPS of the estimated 100 IPS workload to the second storage element the M2. This represents an asymmetric interleaving ratio of 3:7, indicating that for every three I/O access requests directed to the first storage element M1, another seven I/O access requests are directed to the second storage element M2. The interleaving may be accomplished by interleaving minimum storage segments, such as individual cylinders of a hard-disk drive. Accordingly, with the 3:7 asymmetric interleaving ratio, the first three cylinders would be retrieved from the second logical volume $LV_2$ of the first storage element and the next seven cylinders would be retrieved from the second logical volume $LV_2$ of the second storage element M2. This asymmetric interleaving process would repeat according to the 3:7 asymmetric interleaving ratio until the particular I/O access request is serviced.

Finally, the remaining 10 I/O access requests to logical volume $LV_3$ are directed to the second storage element M2. Thus, based on the workload estimates, each of the mirrored storage elements M1, M2 serves a total substantially balanced workload of about 80 IPS. Of course, the actual workloads may vary from the estimates. In some embodiments, the workloads are recalculated periodically and the allocations revised when results differ.

Figure 3B:
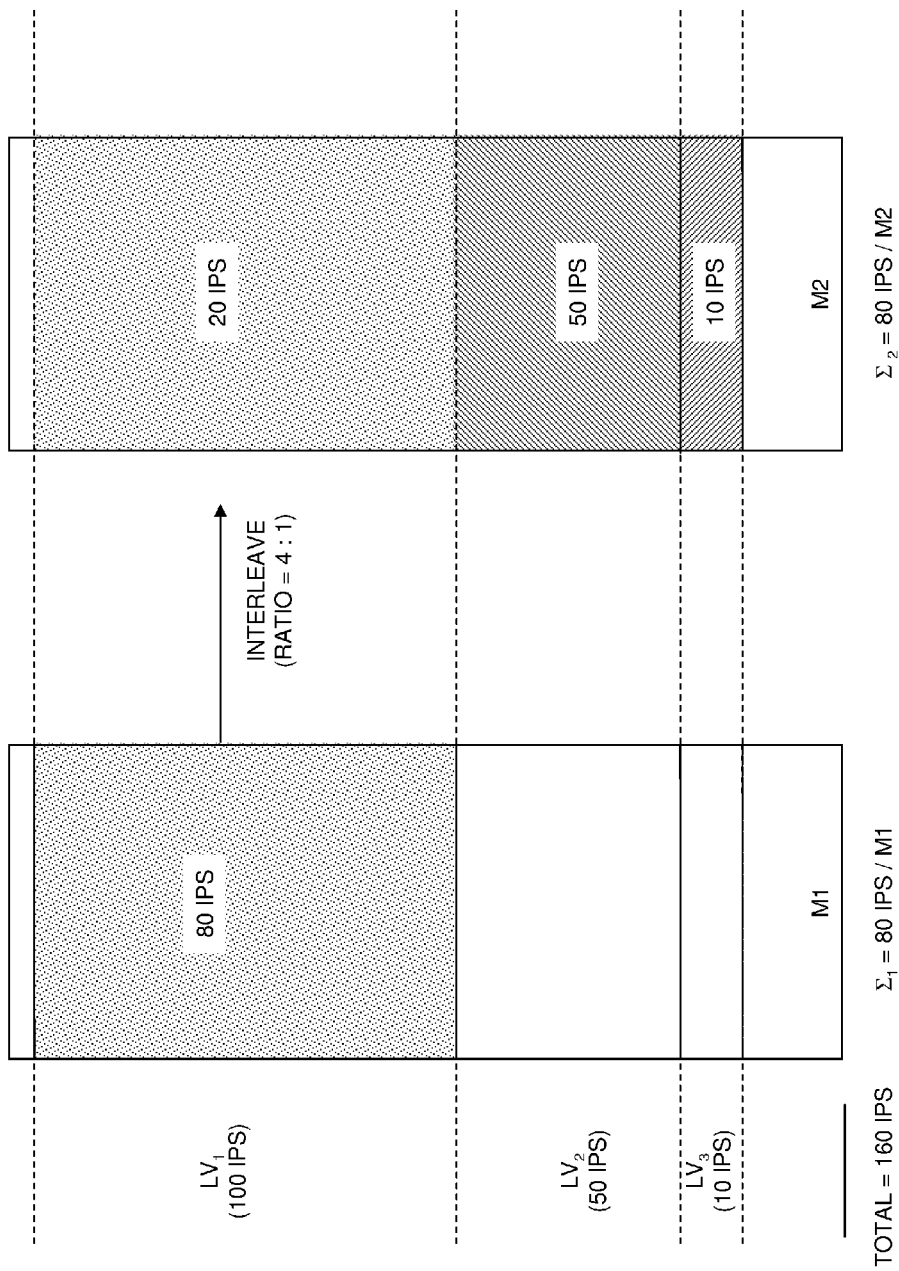

FIG. 3B provides a schematic representation of a different I/O access workload allocation also having a total workload value of 160 IPS, but with a different distribution among the three logical volumes: $LV_1$=100 IPS; $LV_2$=50 IPS; and $LV_3$=10 IPS. The threshold value is once again 80 IPS. Because the first logical volume workload exceeds the threshold, access to it is asymmetrically interleaved between the two storage elements M1, M2 with 80 IPS read from the first logical volume $LV_1$ of the first storage element M1 and 20 read from the first logical volume $LV_1$ of the second storage element M2. The remaining logical volumes are also read from the second storage element M2, such that the I/O access workload is substantially balanced between the two storage elements M1, M2, with each having about 80 IPS.

Figure 3C:
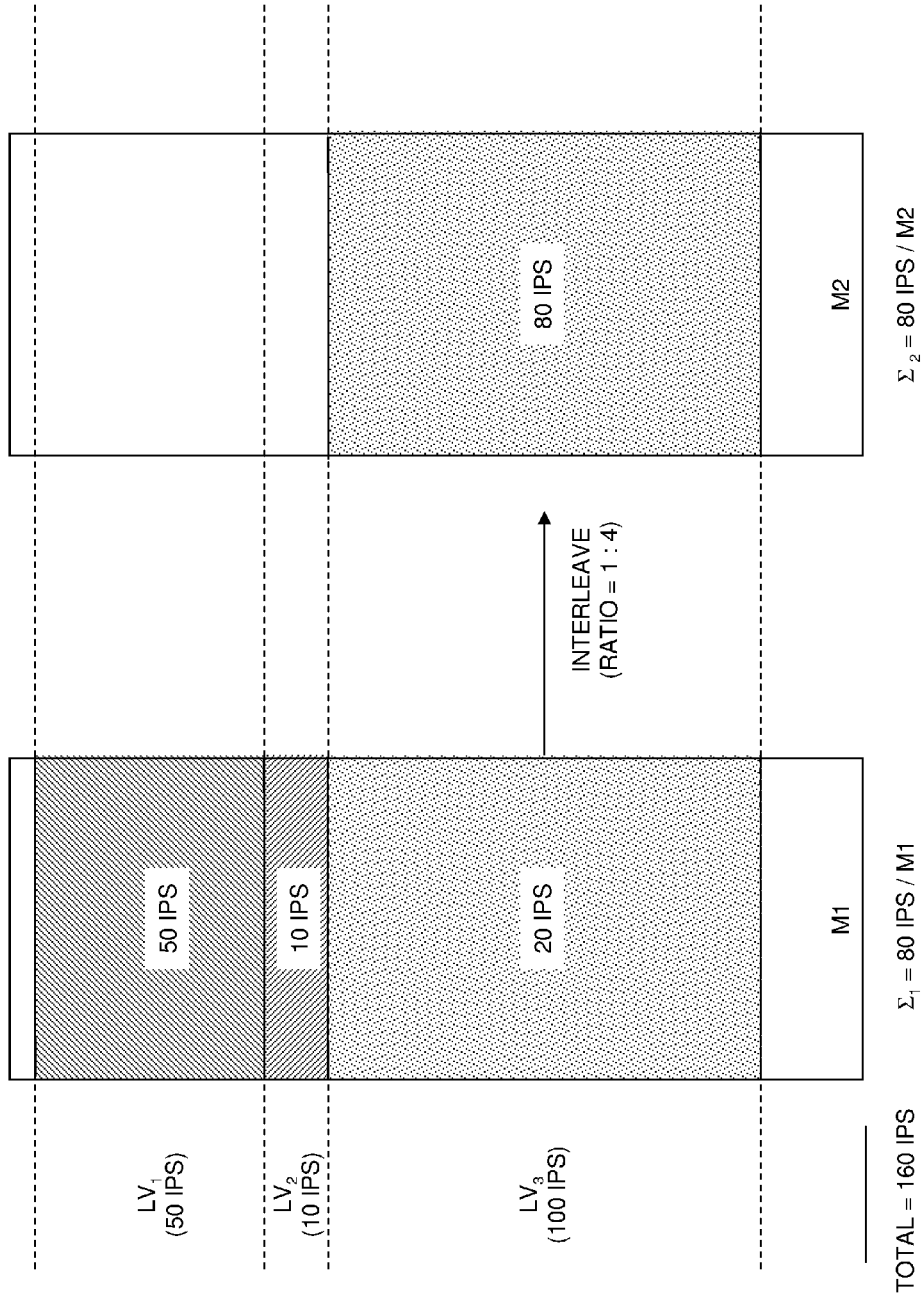

FIG. 3C provides a schematic representation of yet another different I/O access workload allocation also having a total workload value of 160 IPS. The workload distribution among the three logical volumes of this example is: $LV_1$=50 IPS; $LV_2$=10 IPS; and $LV_3$=100 IPS. The threshold value is once again 80 IPS. The first two logical volumes $LV_1$, $LV_2$ are read from the first storage element M1 with their combined workload of 60 IPS being less than the threshold of 80 IPS. Access to the third logical volume $LV_3$ is asymmetrically interleaved between the two storage elements with 20 IPS being read from the first logical volume $LV_1$, bringing the total workload read from that storage element to about 80 IPS. The balance of the 100 IPS workload of the third logical volume $LV_3$ is then read from the second storage element M2, resulting in about 80 IPS being read from that storage element. Once again, the I/O access workload is substantially balanced between the two storage elements M1, M2.

Figure 4:
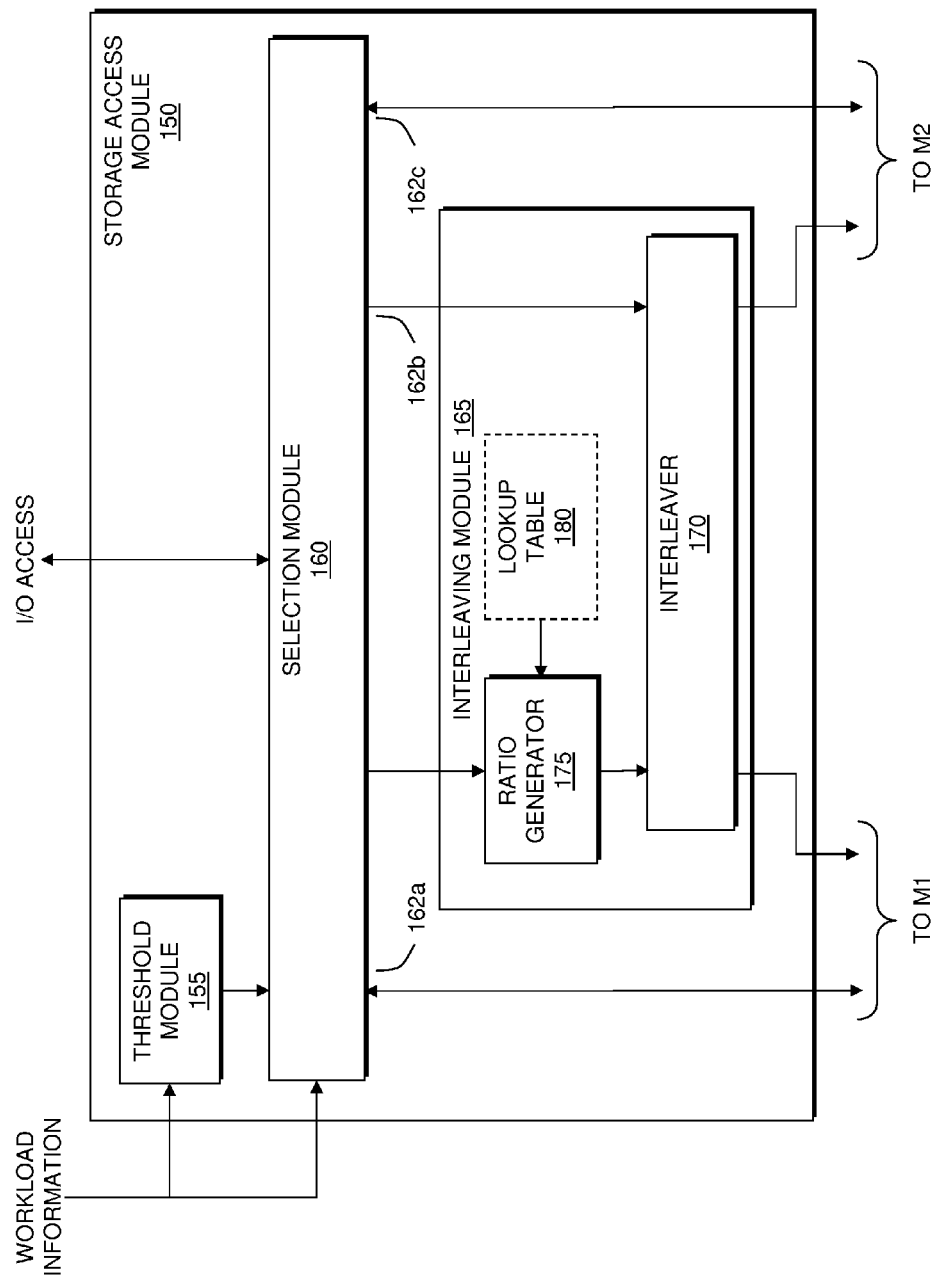
FIG. 4 illustrates a functional block diagram of one embodiment of a storage access module of the device controller of FIG. 1.

FIG. 4 illustrates a functional block diagram of one embodiment of a storage access module 150. The storage access module 150 includes a threshold module 155 coupled to an input side of a selection module 160 and an interleaving module 165 coupled to an output side of the selection module 160.

The threshold module 155 receives workload information including configuration information. For example, the workload information can include the number and identities of multiple logical volumes, together with the respective workload values of each identified logical volume. The threshold module 155 calculates a total workload value by adding the respective workload values of all of the logical volumes. The threshold module 155 then calculates a threshold by averaging the total workload value over the number of storage elements. This information can be obtained from local memory 140 (FIG. 1). This averaging step amounts to division by two for embodiments having two storage entities M1, M2 (FIG. 1).

The selection module 160 receives the calculated threshold value from the threshold module 155 and the workload information including configuration information. The selection module 160 also receives I/O access requests from the I/O module 135 (FIG. 1). For write requests in a mirrored storage application, the selection module 160 generally writes the same information to both storage elements M1, M2. Thus, the write data is routed from each of the two output ports 162a, 162c to the respective mirrored storage element M1, M2.

I/O read requests are directed according to a load-balancing determination, including asymmetrically interleaving access to at least one of the logical volumes. In some embodiments, I/O access to each of the different logical volumes is determined according to a respective read policy. The particular read policy applied with respect to each logical volume can be chosen by logic in the selection module 160. It is the chosen read policy that determines which physical device(s) are accessed in response to a read directed to the respective logical volume. Generally, there can be a different policy applied to each volume, but for each logical volume only one policy can be applied. U.S. Pat. No. 6,954,833 describes a Dynamic Mirror Service Policy (DMSP) mechanism that can be used in the practice of the invention to determine which logical volume is read from which physical device, the entirety of which U.S. patent is incorporated by reference.

A first policy includes reading all data from a scheduled one of the two mirrored storage elements M1, M2. A second policy includes reading different halves of the data from each of the two mirrored storage elements M1, M2. A third policy includes reading data from both mirrored storage elements in an interleaved manner in which successive blocks or cylinders are read from different storage elements M1, M2 (this corresponds to symmetric interleaving in which the interleaving ratio is about 1:1). Asymmetric interleaving, as described herein, represents a fourth logical-volume access policy.

The selection module 160 receives the number and identities of logical volumes from the workload information. From this, the selection module 160 assigns one of the different access policies to each of the respective logical volumes, maintaining during this assignment process a partial sum of the total workload directed to each of the different storage elements M1, M2. Thus, the selection module 160 independently tracks the total number of read requests directed to each of the storage elements M1, M2 and compares each of the partial sums to the threshold value. This process continues as long as both of the partial sums are below the threshold value.

For example, reads to data stored on odd logical volumes are targeted to the first storage element M1; whereas, reads to data stored on even logical volumes are targeted to the second storage element M2. For this example, the first partial sum represents the total workload or number of read requests from the odd logical volumes directed to the first storage element M1. The second partial sum represents the total workload or number of read requests directed from the even logical volumes to the second storage element.

The first logical volume that causes either of the partial sums to exceed the threshold value is directed by a third output port 162b to the interleaving module 165. The selection module 160 retains an allocation of the first group of logical volumes directed to the first storage element M1, the second group of logical volumes directed to the second storage element M2, and the third logical volume directed to the interleaving module 165. The selection module 160 then receives read requests and directs them to the appropriate output port 162a, 162b, 162c depending upon the targeted logical volume.

The interleaving module 165 includes a ratio generator 175 for generating the asymmetric interleaving ratio as required for a particular configuration of logical volumes and workloads. The ratio generator 175 receives the threshold value and the partial sum values from the selection module 160 and uses these to generate the asymmetric interleaving ratio. For example, the ratio generator 175 subtracts one of the two partial sums from the threshold value to determine a first asymmetric interleave value. The ratio generator 175 determines a second asymmetric interleave value as the difference between the workload directed to the third logical volume and the first asymmetric interleave value.

Thus, for the example of FIG. 3A, the ratio generator 175 receives a threshold value of 80, calculates a first partial sum of 50 (directed to the first storage element M1) and a second partial sum of 0 (directed to the second storage element). The ratio generator subtracts the larger partial sum (i.e., 50) from the threshold value resulting in a first asymmetric interleave value of 30. The ratio generator 175 then subtracts the first asymmetric interleave value (i.e., 30) from the workload directed to the second logical volume $LV_2$ (i.e., 100), resulting in a second asymmetric interleave value of 70. The ratio generator 175 then calculates the asymmetric interleaving ratio between the first and second storage elements M1, M2 as the quotient of the first asymmetric interleave value (i.e., 30) and the second asymmetric interleave value (i.e., 70) resulting in an asymmetric interleaving ratio of 3:7.

The interleaving module 165 also includes an interleaver 170 receiving the asymmetric interleaving ratio from the ratio generator 175 and the read requests directed to the logical volume being asymmetrically interleaved. The interleaver 170 proceeds to interleave the read requests to the different storage elements M1, M2 as determined by the asymmetric interleaving ratio.

In some embodiments, the interleaving module 165 also includes a look-up table 180 coupled to the ratio generator 175. The look-up table 180 includes a set of predetermined asymmetric interleaving ratios. The look-up table 180 also includes ranges associated with each of the predetermined asymmetric interleaving ratios. For example, the ranges can be determined from a ratio 'R' of the first asymmetric interleave value (i.e., the difference between the threshold value and one of the partial sums) to the workload of the associated logical volume.

$$\text{Ratio} = (\text{Threshold} - \text{Partial Sum})/(\text{workload of interleaved LV}) \quad (2)$$

Continuing with the example described in relation to FIG. 3A, R=0.30. Table I provides an exemplary look-up table including ranges for 'R'.

TABLE I

Ratio Look-Up Table

| 'R' | Asymmetric Interleaving Ratio |
|---|---|
| Less than 0.05 | 0:1 |
| 0.05–0.15 | 1:8 |
| 0.15–0.22 | 1:4 |
| 0.22–0.29 | 1:3 |
| 0.29–0.41 | 1:2 |

TABLE I-continued

Ratio Look-Up Table

| 'R' | Asymmetric Interleaving Ratio |
|---|---|
| 0.41-0.58 | 1:1 |
| 0.58-0.70 | 2:1 |
| 0.70-0.77 | 3:1 |
| 0.77-0.85 | 4:1 |
| 0.85-0.95 | 8:1 |
| Over 0.95 | 1:0 |

Thus, for the example in which 'R' is 0.30, the asymmetric interleaving ratio should be 1:2. The exact asymmetric interleaving ratio would have been 3:7 (approximately expressed as 1:2.3). The value 0.30 for 'R' falls within the 'R' value range of 0.29-0.41 of Table I, which is associated with the asymmetric interleaving ratio of 1:2. Thus, the ratio 1:2 is selected as it is the closest approximation to the actual asymmetric interleaving ratio provided in the look-up table 180.

Figure 5:
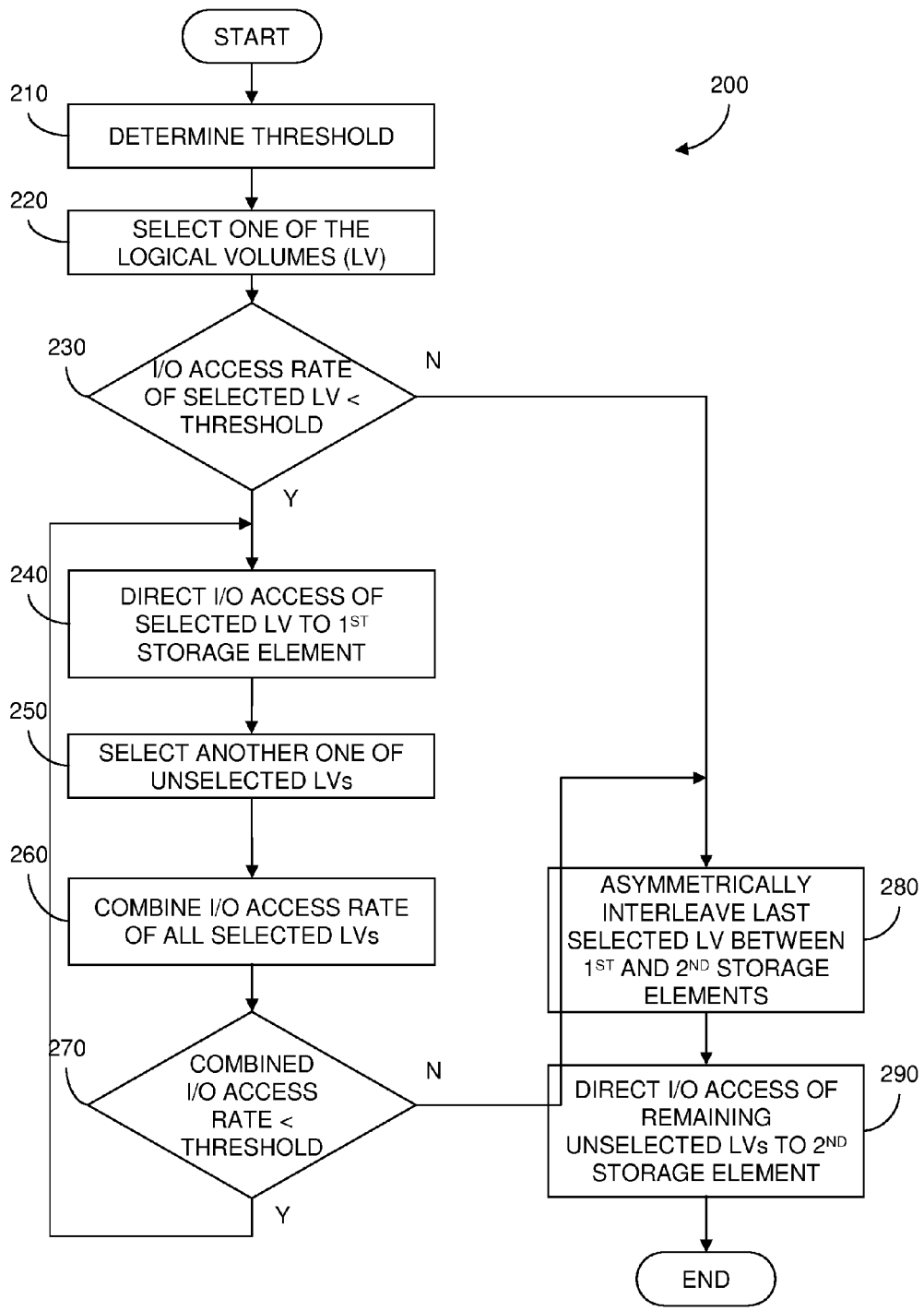
FIG. 5 illustrates a flow diagram of a method for accessing the same data stored on redundant storage elements in accordance with one embodiment of the invention.

FIG. 5 illustrates a flow diagram of one embodiment of a load-balancing process 200 for accessing the same data stored on redundant storage elements in accordance with the principles of the invention. A threshold is determined at step 210. The threshold is equivalent to the threshold described above and represents a balanced workload value among the different storage elements M1, M2. A first one of the logical volumes is selected at step 220. In some embodiments, the logical volumes are selected sequentially according to their respective reference numbers. Thus, logical volume $LV_1$ would be selected first.

The I/O access rate of the selected logical volume is compared to the threshold at step 230. If the I/O access rate is less than the threshold value, I/O access to the first selected logical volume is directed to one of the two storage elements (e.g., the first storage element M1) at step 240. Another one of the unselected logical volumes is selected at step 250. The respective workload is added to the workload of the previously-selected logical volume at step 260 to determine the combined workload from all of the selected logical volumes directed to the first storage element M1. The combined workload directed to the first storage element M1 is compared to the threshold at step 270. If the combined workload is less than the threshold, the process repeats steps 240 through 270 until the combined workload value is equal to or greater than the threshold value.

Access to the last-selected logical volume is interleaved between the first and second storage elements at step 280, such that the total workload directed to the first storage element is approximately equal to the threshold value. Access to any remaining unselected logical volumes is directed to the second storage element M2 at step 290. The result approximately balances the workload between the first and second storage elements M1, M2. After access to all of the logical volumes is determined according to the process 200, subsequent read requests to the different logical volumes are directed as determined by the process 200.

Steps 280 and 290 are also implemented when the I/O access rate of the first selected LV is equal to or greater than the threshold at step 230. FIG. 3B illustrates one example of a situation in which the first logical volume selected is asymmetrically interleaved.

As workloads may vary over time for any of a number of different reasons, the process 200 can be repeated periodically to revise the workload allocations to the different storage elements M1, M2. A failure to revise the workloads in this manner can lead to a departure from the goal of balanced access to the two storage elements M1, M2.

Figure 6:
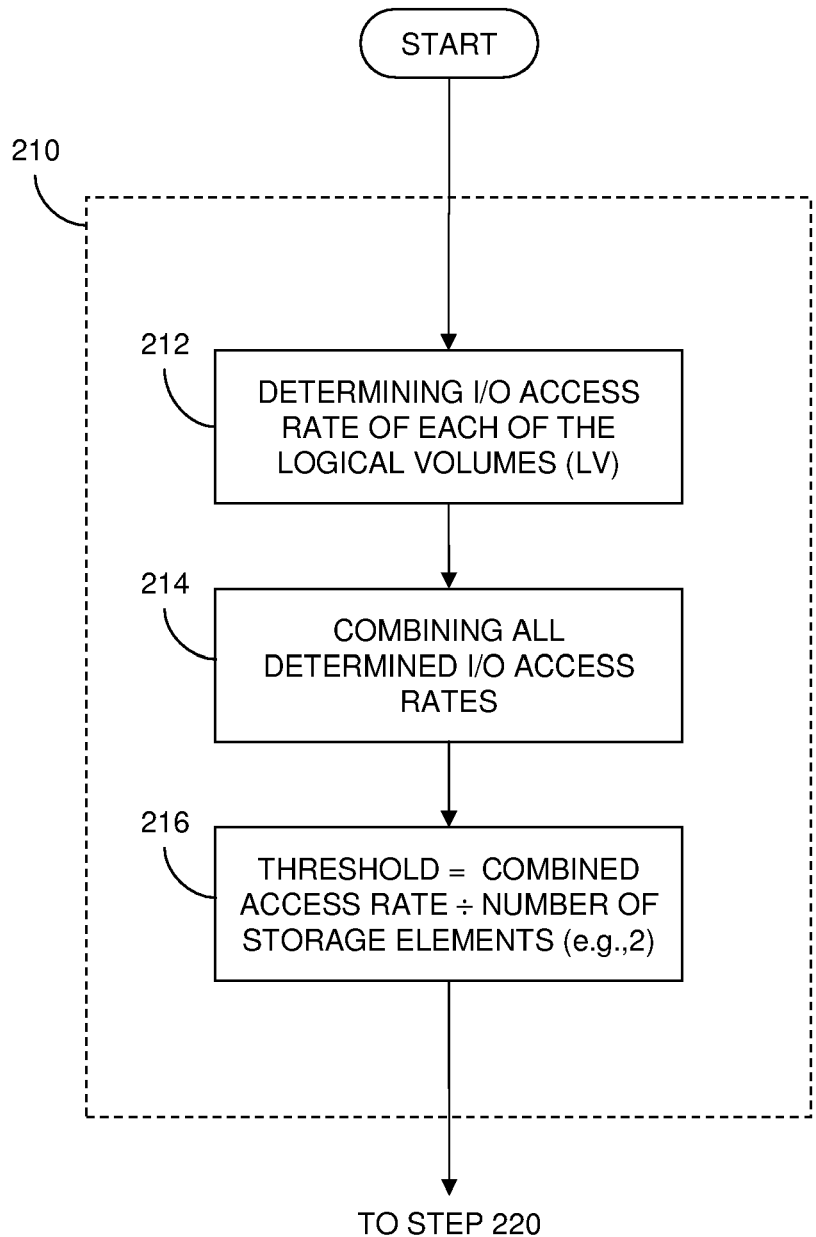
FIG. 6 illustrates a flow diagram of one embodiment of the determining the threshold step of FIG. 5.

FIG. 6 illustrates flow diagram of one embodiment of the threshold detecting step 210. Determining the threshold can include determining a workload value of each of the logical volumes at step 212, combining together all of the determined workload values at step 214, and determining a threshold by dividing the combined workload value by the number of storage elements (i.e., 2) at step 216.

Figure 7:
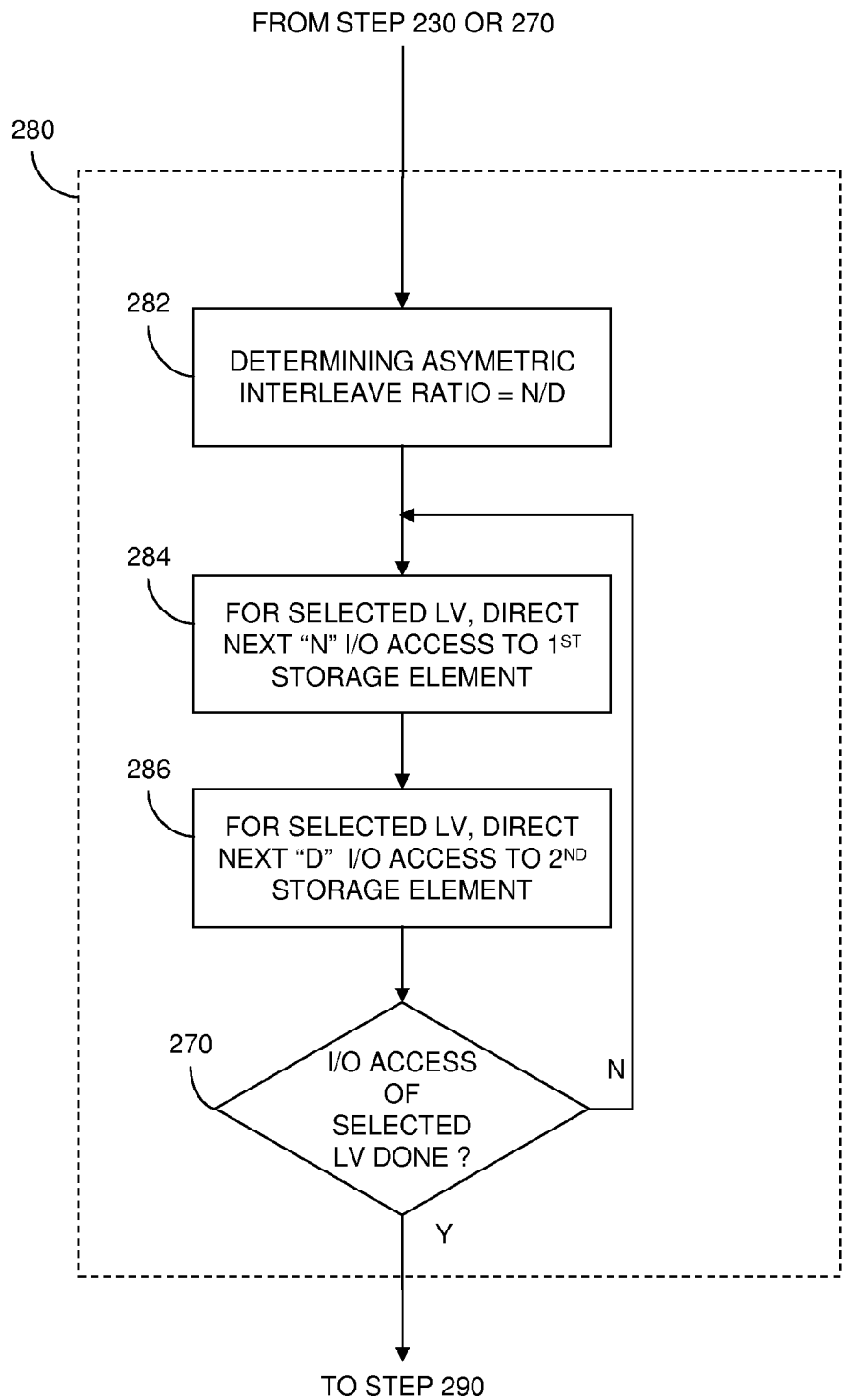
FIG. 7 illustrates a flow diagram of one embodiment of the asymmetrically interleaving step of FIG. 5.

FIG. 7 illustrates a flow diagram of one embodiment of the asymmetric interleaving step 280. At step 282, an asymmetric interleaving ratio (N/D) is determined (e.g., by calculation or by using the lookup table). At step 286, "N" I/O access requests are directed to one of the redundant storage elements at step 284 and "D" I/O requests are directed to the other of the redundant storage elements. Steps 284, 286 and 290 are repeated until I/O access to the selected logical volume is completed at step 270.

While the present invention has been shown and described herein with reference to specific embodiments thereof, it should be understood by those skilled in the art that variations, alterations, changes in form and detail, and equivalents may be made or conceived of without departing from the spirit and scope of the invention. Accordingly, the scope of the present invention should be assessed as that of the appended claims and by equivalents thereto.

What is claimed is:

1. A storage controller for accessing data stored in a plurality of logical volumes divisible into a first logical volume and a second logical volume, each logical volume being replicated on first and second storage elements, each replication storing the same data, comprising:
    a storage-element selector receiving input/output (I/O) access requests, the storage-element selector directing each I/O access request targeted to the first logical volume to one of the first and second storage elements; and
    an interleaving module in communication with the storage-element selector, the interleaving module comprising a ratio generator providing an asymmetric interleaving ratio for use in distributing I/O accesses to the first and second storage elements, and an interleaver receiving the asymmetric interleaving ratio and asymmetrically interleaving between the first and second storage elements according to the asymmetric interleaving ratio, I/O access requests targeting the second logical volume.

2. The storage controller of claim 1, further comprising an interleaving ratio look-up table in communication with the ratio generator, the interleaving ratio look-up table storing a predetermined set of asymmetric interleaving ratios, the ratio generator selecting the asymmetric interleaving ratio from the predetermined set of asymmetric interleaving ratios.

3. The storage controller of claim 1, further comprising a threshold module in communication with the storage-element selector, determining an I/O access threshold, wherein combined I/O access requests targeting the first logical volume and combined I/O access requests targeting a third logical volume are each less than the I/O access threshold.

4. The storage controller of claim 3, wherein the threshold module comprises an averaging module for averaging the combined I/O access workload over the first and second storage elements.

5. The storage controller of claim 1, wherein the first and second storage elements are physical storage devices, each configured substantially identical with respect to the other.

6. The storage controller of claim 1, wherein each physical storage device is a hard disk drive.

7. A method for accessing data stored in a plurality of logical volumes including a first logical volume and a second logical volume, each logical volume replicated on first and second storage elements, each replication storing the same data, the method comprising:

provisioning an asymmetric interleaving ratio for use in distributing input/output (I/O) accesses to the first and second storage elements;

directing all I/O access requests targeting the first logical volume to one of the first and second storage elements; and asymmetrically interleaving access to the first and second storage elements according to the asymmetric interleaving ratio for I/O access requests targeting the second logical volume.

8. The method of claim 7, wherein the asymmetric interleaving provides, for the plurality of logical volumes, a total number of I/O access requests directed to the first storage element to be approximately equal to a total number of I/O access requests directed to the second storage element.

9. The method of claim 7, further comprising:

directing, to the other of the first and second storage elements, each input/output (I/O) access request targeting a third logical volume of the plurality of logical volumes; and determining an I/O access threshold, wherein a total number of I/O access requests directed to the first storage element and a total number of I/O access requests directed to the second storage element are each approximately equal to the I/O access threshold.

10. The method of claim 9, wherein determining the I/O access threshold comprises:

determining a combined I/O access workload for the plurality of logical volumes; and averaging the combined I/O access workload over the first and second storage elements.

11. The method of claim 10, wherein determining the combined I/O access workload comprises:

determining an individual I/O access workload for each of the plurality of logical volumes; and summing the individual I/O access workloads of the plurality of logical volumes.

12. The method of claim 11, wherein determining the individual I/O access workloads comprises:

monitoring for a predetermined time interval, I/O access requests targeting each of the plurality of logical volumes;

totaling separately for each of the logical volumes, a number of monitored I/O access requests occurring during the predetermined time interval;

dividing for each of the plurality of logical volumes the total number of monitored I/O access requests by the predetermined time interval, wherein the quotient is the individual I/O access workload for that logical volume.

13. The method of claim 7, further comprising selecting the asymmetric interleaving ratio from a predetermined set of asymmetric interleaving ratios.

14. The method of claim 7, wherein the first and second storage elements are physical storage devices, each configured substantially identical with respect to the other.

15. The method of claim 14, wherein each physical storage device is a hard-disk drive.

16. The method of claim 7, wherein the I/O access requests include read requests.

17. The method of claim 7, further comprising directing, to the other of the first and second storage elements, each input/output (I/O) access request targeting a third logical volume replicated on each of the first and second storage elements.

18. A method for accessing data stored in a plurality of logical volumes, each logical volume replicated on first and second storage elements, each replication of a given logical volume storing the same data, the method comprising:

determining an input/output (I/O) access workload for each logical volume of the plurality of logical volumes;

determining an I/O access threshold based on the I/O access workloads of the plurality of logical volumes;

providing an asymmetric interleaving ratio for use in limiting a number of read accesses to each storage element to approximately the I/O access threshold for a given period; and asymmetrically interleaving read accesses across the first and second storage elements in accordance with the asymmetric interleaving ratio in response to I/O access requests targeted to one of the logical volumes.

* * * * *